US012419795B2

(12) United States Patent
Turturiello

(10) Patent No.: US 12,419,795 B2
(45) Date of Patent: Sep. 23, 2025

(54) CONVERTIBLE WHEELCHAIR COMPRISING SLIDE SEAT

(71) Applicant: Low & Go, INC., Holmes Beach, FL (US)

(72) Inventor: George Turturiello, Honesdale, PA (US)

(73) Assignee: Low & Go, Inc., Holmes Beach, FL (US)

( * ) Notice: Subject to any disclaimer, the term of this patent is extended or adjusted under 35 U.S.C. 154(b) by 812 days.

(21) Appl. No.: 17/703,702

(22) Filed: Mar. 24, 2022

(65) Prior Publication Data

US 2023/0301852 A1 Sep. 28, 2023

(51) Int. Cl.
*A61G 5/10* (2006.01)
*A61G 5/04* (2013.01)
*A61G 5/14* (2006.01)

(52) U.S. Cl.
CPC .............. *A61G 5/1056* (2013.01); *A61G 5/04* (2013.01); *A61G 5/1059* (2013.01); *A61G 5/14* (2013.01)

(58) Field of Classification Search
CPC ..................................................... A61G 5/1056
See application file for complete search history.

(56) References Cited

U.S. PATENT DOCUMENTS 5,651,149 A * 7/1997 Garman ............... A61G 7/1044 5/81.1 R
6,325,399 B1 * 12/2001 DeMoss ............... A61G 7/1067 280/250.1
6,361,267 B1 * 3/2002 Chuang .................. A61G 7/103 414/539
7,758,063 B2 7/2010 Johnson et al.
7,921,954 B2 4/2011 Johnson et al.
8,123,245 B2 2/2012 Johnson et al.
8,544,866 B2 * 10/2013 Noonan ............... A61G 7/1034 5/81.1 HS
8,985,600 B2 * 3/2015 Nyitray ................ A61G 5/1056 280/47.41
10,434,023 B1 * 10/2019 Fonarow .............. A61G 7/1026
11,052,003 B2 7/2021 Depalo et al.
(Continued)

FOREIGN PATENT DOCUMENTS

CN 107898567 A * 4/2018 ............... A61G 5/06
CN 109248031 A * 1/2019
(Continued)

*Primary Examiner* — Kevin Hurley
(74) *Attorney, Agent, or Firm* — Kilyk & Bowersox, P. L.L.C.

(57) ABSTRACT

A wheelchair is provided that includes a motor-driven laterally extendable platform that can be extended and retracted to assist a user in getting onto and off of the wheelchair. A motor drive system is provided that can be actuated by an actuator. The actuator can be, for example, a wired remote controller or a wireless remote controller. Full actuation can be accomplished by a single triggering motion of the actuator, or the actuator can be configured to require a constant holding of the actuator until a desired position of the platform is reached. Travel limits can be programmed into the motor drive system such that the drive system stops driving extension or retraction of the platform once a travel limit is reached. The wheelchair can also be converted into a recumbent position. Methods of transferring a user onto or off of the wheelchair are also provided.

14 Claims, 12 Drawing Sheets

(56) References Cited

U.S. PATENT DOCUMENTS

| | | | | |
|---|---|---|---|---|
| 11,071,664 | B2 * | 7/2021 | Tu | A61G 7/1025 |
| 2004/0262859 | A1 | 12/2004 | Turturiello et al. | |
| 2005/0046129 | A1 | 3/2005 | Abtonishak et al. | |
| 2005/0088024 | A1 | 4/2005 | Rozaieski et al. | |
| 2006/0082117 | A1 | 4/2006 | Turturiello et al. | |
| 2010/0276898 | A1 * | 11/2010 | Johnson | A61G 5/045<br>280/6.151 |

FOREIGN PATENT DOCUMENTS

| | | | | | |
|---|---|---|---|---|---|
| CN | 218923020 | U | * | 4/2023 | |
| CN | 116158917 | A | * | 5/2023 | |
| WO | WO-2021102427 | A1 | * | 5/2021 | A61G 5/022 |

* cited by examiner

CONVERTIBLE WHEELCHAIR COMPRISING SLIDE SEAT

FIELD OF THE INVENTION

The present invention relates to a wheelchair and methods to assist users onto and off of a wheelchair.

BACKGROUND OF THE INVENTION

For the majority of wheelchair users, it is difficult to get onto and off of the user's wheelchair. Some wheelchair users have lost use of one or more limbs or have one or more disabled limbs undergoing healing. Some users are instructed to move as little as possible so that healing of a non-limb-related injury or operation can proceed.

To assist in moving a user or for a user to move oneself onto and off of a wheelchair, expensive equipment and services may be required. Patient lifts and ceiling lifts are sometimes needed for safe lateral transfers. Sliding boards and aide services are sometimes needed for safe lateral transfers.

A need exists for a safe and reliable wheelchair and method that assists a wheelchair user in getting onto and off of a wheelchair, especially a wheelchair that would enable a user to get onto and off of a wheelchair without requiring assistance from an aide.

SUMMARY OF THE INVENTION

To achieve these and other advantages, and in accordance with the purposes of the present invention, as embodied and broadly described herein, the present invention relates to a wheelchair comprising a plurality of wheels, a base, a seat member, at least one motor, and a laterally extendable member configured to laterally extend the seat member with respect to the rest of the wheelchair. The base comprises a main frame. The seat member is mounted on the laterally extendable member. The laterally extendable member is configured to laterally extend the seat member in relation to the main frame such that a user sitting on the seat member can be moved laterally in relation to the main frame. The laterally extendable member is also configured to laterally retract the seat member in relation to the main frame. The at least one motor is operably connected to the main frame and to one or both of the laterally extendable member and the seat member.

The slidable seat member can be configured to move either to the right or to the left. Movement can be of a given distance to facilitate a safe and controlled transfer, of a user, from the wheelchair to a surface next to the chair. The laterally extendable member can comprise a platform, linear rails, and linear carriages as parallel guides. The motion can be driven or powered by an actuator. The linear rails, linear carriages, or both, can be part of the laterally extendable member.

A motor control board can be configured to actuate the motion in an extension mode or in a retraction mode, via a remote controller. A remote controller or remote fob can be used and the fob can be detachable from, detached from, or completely separate and apart from, the wheelchair. Fasteners can be provided, for example, hook and loop fasteners, magnetic fasteners, a pocket, holder, or the like, to removably attach or hold the remote controller to or on the wheelchair. The remote controller can thus be fastened to or otherwise held by the wheelchair, for example, when the remote controller is not in use. The remote controller can be configured to send a randomly generated control signal, code, or the like, for example, for security and safety reasons, to a control unit in the form of a circuit board, integrated circuit, processor, or the like. The control unit is configured to control the actuator based on a code signal received, to extend or retract the seat member. The sliding seat eliminates the need for patient lifts, an aide, ceiling lifts, or sliding boards for safe lateral transfers.

It is to be understood that both the foregoing general description and the following detailed description are exemplary and explanatory only and intended to provide a further explanation of the present invention, as claimed.

BRIEF DESCRIPTION OF THE DRAWINGS

The invention may be more fully understood with reference to the accompanying drawings. The drawings are intended to illustrate, not limit, the present teachings.

DETAILED DESCRIPTION OF THE INVENTION

Figure 1A:
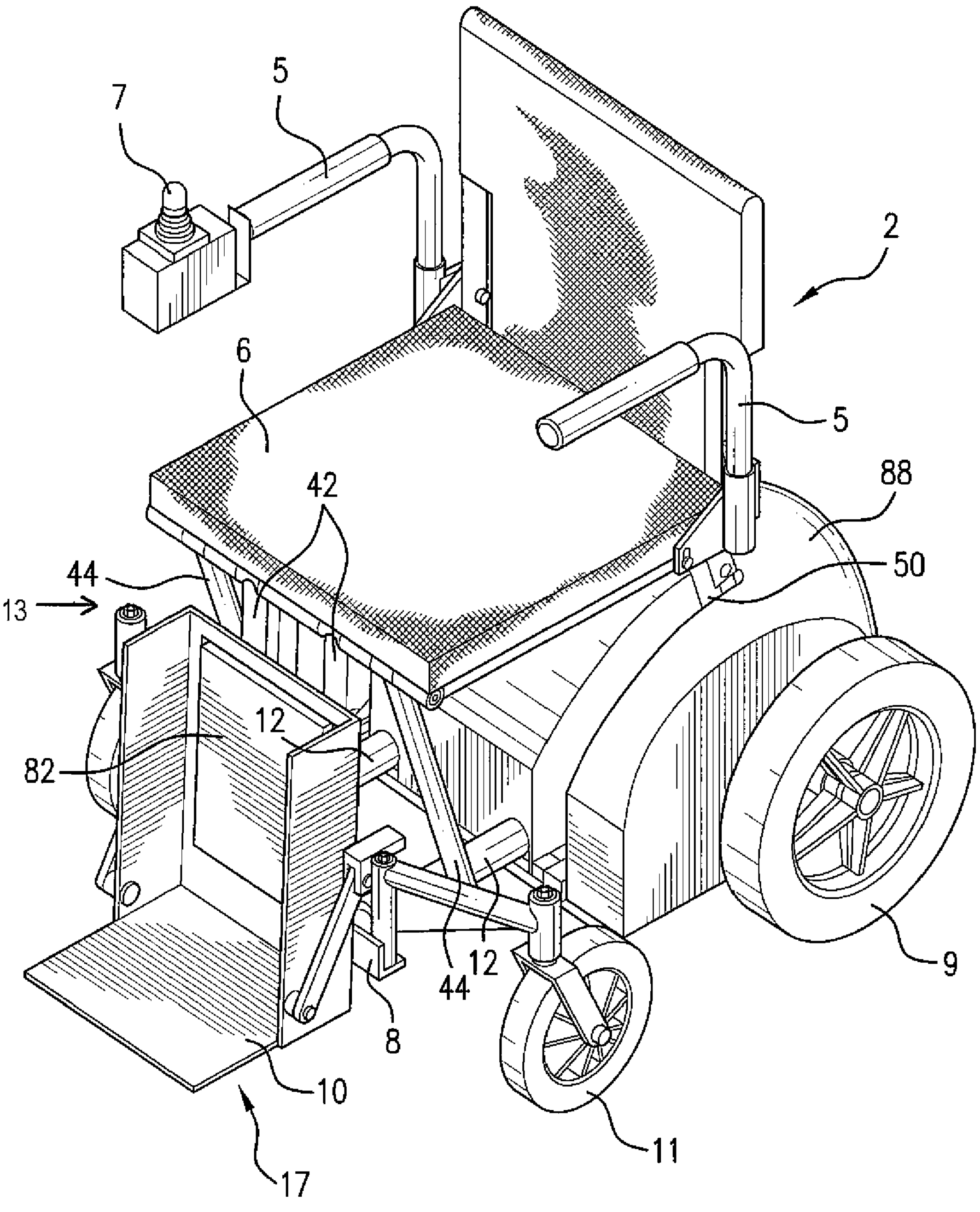
FIG. 1A is a perspective view of a wheelchair according to an embodiment of the present invention, wherein the wheelchair is in an uppermost position.
Figure 1B:
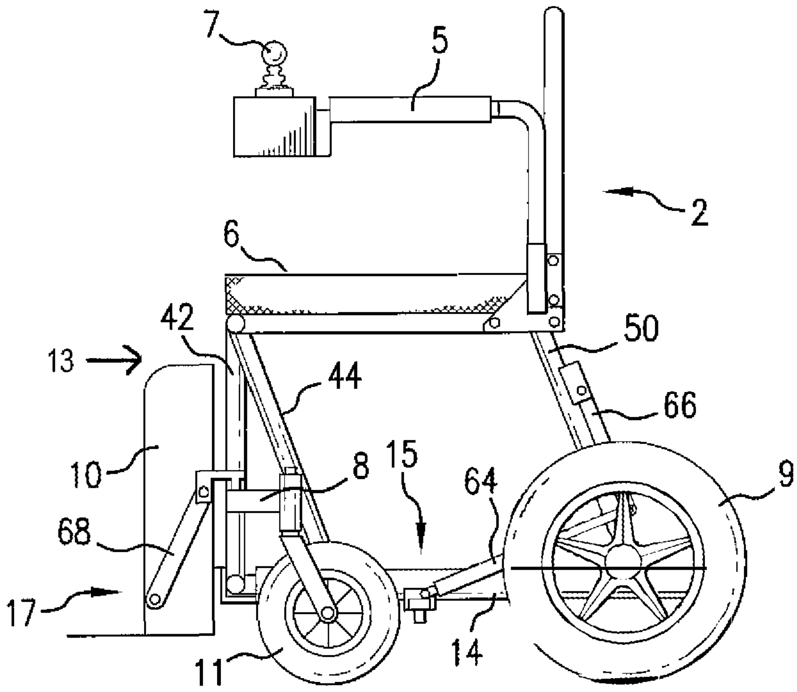
FIG. 1B is a side view of the wheelchair shown in FIG. 1A, but wherein both the protection cover 82 and component cover 88, shown in FIG. 1A, have been removed to show more of the inner-workings of the wheelchair.

According to various embodiments of the present invention, a wheelchair is provided that includes a motor-driven laterally extendable platform that can be extended and retracted to assist a user in getting off of and onto the wheelchair. A motor drive system is provided that can be actuated by an actuator, for example, a button, a joystick, a lever, a toggle, or the like. The actuator can be a remote controller, for example, a wired remote controller or a wireless remote controller. Full actuation can be accomplished by a single triggering motion of the actuator, or the actuator can be configured to require a constant holding of the actuator until a desired position of the platform is reached, and/or a combination of control features can be provided. Travel limits can be programmed into the motor drive system such that the drive system stops driving extension or retraction of the platform once a travel limit is reached. The control system can be set-up such that two clicks can deliver a different control signal than a single click. Different buttons can be provided on the remote controller.

The wheelchair can comprise a plurality of wheels or treads, a base, a seat member, a laterally extendable member, and at least one motor. The base can comprise a main frame. The seat member can be mounted on the laterally extendable member. The laterally extendable member can be configured to laterally extend the seat member in relation to the main frame such that a user sitting on the seat member can be moved laterally in relation to the main frame. The laterally extendable member can also be configured to laterally retract the seat member in relation to the main frame. The at least one motor can be operably connected to the main frame and also to one or both of the laterally extendable member and the seat member.

The at least one motor can comprise a linear actuator, for example, a single linear actuator or a pair of linear actuators. The at least one motor can comprise a pair of motors. A motor control system can be provided that is configured to actuate the motor to perform an extension function. A motor control system can be provided that is configured to actuate the motor to perform an extension function, and configured to actuate the motor to perform a retraction function. The motor control system can comprise a wireless remote controller. The wireless remote controller can comprise a key fob configured to remotely initiate an action of the at least one motor. The wireless remote controller can have a limited operating range, for example, an operating range of 50 feet or less, of 25 feet or less, of 20 feet or less, of 15 feet or less, or of ten feet or less. The present invention also relates to a method of tailoring the range of a wireless remote controller by reducing the size of the transmitting antenna, the receiving antenna, or both antennae.

According to various embodiments, the laterally extendable platform can be a member that is part of a guide and rail system. The guide and rail system can comprise one or more rails and one or more guides. The seat member can be mounted to the one or more rails, mounted to the one or more guides, or mounted to a combination of rails and guides. In some embodiments, the seat member can be mounted to the one or more rails, or mounted to the one or more guides, and the other of the one or more rails or the one or more guides is mounted to the main frame. The one or more rails and the one or more guides can be configured to cooperate such that the one or more guides restrict motion of the one or more rails in two directions, yet guide motion of the one or more rails in a third direction.

According to various embodiments, the wheelchair comprises a guide and rail system comprising a plurality of rails and a plurality of guides. The seat member can be mounted to the plurality of rails and each of the plurality of rails can be parallel to the others of the plurality of rails. The plurality of guides can be mounted to the main frame or base or the wheelchair. The plurality of rails and plurality of guides can cooperate such that the plurality of guides restricts motion of the plurality of rails in two directions, and guides motion of the plurality of rails in a third direction.

According to various embodiments, the wheelchair comprises a guide and rail system comprising a plurality of rails and a plurality of guides, wherein the seat member is mounted to the plurality of guides. The plurality of rails can be mounted to the main frame and each of the plurality of rails can be parallel to the others of the plurality of rails. The plurality of rails and plurality of guides can be configured to cooperate such that the plurality of rails restrict motion of the plurality of guides in two directions, and guides motion of the plurality of guides in a third direction.

According to various embodiments, the wheelchair further comprises a leg support assembly and a longitudinally extendable member. The main frame comprises at least two wheels, the longitudinally extendable member comprises at least two wheels, and the leg support assembly is pivotably connected to the longitudinally extendable member. The length of the base is configured to be increased by extending the longitudinally extendable member from the main frame, and decreased by retracting the longitudinally extendable member to or into the main frame. The main frame and the longitudinally extendable member are configured such that the distance between the at least two wheels of the main frame and the at least two wheels of the longitudinally extendable member increases or decreases as the longitudinally extendable member respectively extends and retracts. The height of the seat member can be configured to be increased or decreased, and the leg support assembly can be configured to pivot along with a user's legs at the knees as the leg support assembly extends away from the seat member and the user's legs extend. The longitudinally extendable member can be operably connected to at least one extender device. The base can be lengthened when the at least one extender device is extended.

Moreover, the seat member can be operably connected to at least one seat member extension device, and the seat member can be configured to be lowered when the at least one extender device is extended. The wheelchair can further comprise at least one transformer motor operably connected to the main frame, and the transformer motor can be configured: to adjust the length of the base; to adjust the height of the seat member; or both. Various parts, control systems, drive systems, and features that can be implemented includes those shown and described in U.S. Pat. No. 8,123,245 B2 to Johnson et al, U.S. Pat. No. 7,921,954 B2 to Johnson et al., and U.S. Pat. No. 7,758,063 B2 to Johnson et al., which are incorporated herein in their entireties by reference.

The present invention also relates in general to a wheelchair, a mobile unit, a vehicle, or another similar mobile device that stabilized transportation for one or more passengers and includes a sliding seat configured to assist a user with getting off of, and onto, the wheelchair. According to various aspects of the invention, the sliding seat can be used to assist a user in moving onto a bed, off of a bed, onto a toilet seat, off of a toilet seat, onto a surgical or hospital table, off of a surgical or hospital table, onto a chair or other piece of furniture, off of a chair or other piece of furniture, or the like. According to various aspects of the invention, the sliding seat can be configured to translate or slide to the left, to translate or slide to the right, or to translate or slide to both the left and the right.

According to various aspects of the invention, a remote-control device, for example, a key fob, can be used to control the sliding movement of the sliding seat. For example, a key fob can be used. A small electronic device can be used, for example, akin to a car key fob used to unlock a door, start a vehicle, or remotely initiate the action of another device such as a garage door. The device can include a wireless system that is triggered by pressing a button on the device. Once triggered, the remote-control device can send a control signal, wirelessly, to the wheelchair sliding seat system to initiate a seat extension motion or a seat retraction motion. The remote-control device can have a range limited to 20 feet or less, for example, 15 feet or less, 12 feet or less, 10 feet or less, or eight feet or less. For situations where the wheelchair user is also in control of the remote-control device, a limited range can be beneficial to prevent interference or pairing with other, undesired devices.

The remote-control device can be a key fob used as a one-way key fob that pairs with the control unit of the wheelchair. The key fob can be used with a vehicle control unit identifier (ID) to enable entity authentication or trust transfer, for example, to achieve a secured initial pairing. The key fob can be configured, or chosen, such that it is capable of only transmitting only, not receiving. The key fob can be paired with the control unit in the wheelchair, or with any other control unit or device on or that is a part of or associated with the wheelchair. The use of such a key fob and control unit ID prevents unauthorized pairing and, for example, can be used to prevent access to an operation key that can later be used for communications between the devices. Elliptical curve cryptography (ECC) can be used for strong security and efficient implementation. In the pairing process, a device ID can be used for entity authentication and public key cryptography can be used for easy key management. Symmetric encryption can be used for fast normal operation and to accommodate key fob addition or revocation after key fob loss. An exemplary key fob and system that can be used according to the present invention is described, for example, in U.S. Pat. No. 10,477,402 B2 to Ho, which is incorporated herein in its entirety by reference.

According to various aspects of the present invention, the height of the seat member can be adjusted, for example, to raise or lower the user's position. According to various aspects, the height of the seat member can be lowered to provide more stable transportation for the user of the invention by lowering the center of gravity so that it is closer to an operating surface. In another aspect, the wheelchair, mobile unit, vehicle, or mobile device can be adjusted to increase or decrease the size of its footprint. The footprint can be enlarged to provide more stable transportation for the user. Both the height of the seat member and the size of the footprint can be adjusted to provide more stability.

A stabilizer rod, for example, a kick-stand, stabilizer foot, or the like, can be provided on each side of the wheelchair from which the seat, seat portion, or seat member laterally extends. If the wheelchair is configured for lateral extension to the right, and for lateral extension to the left, stabilizer rods can be provided on each side of the wheelchair. The wheelchair can be configured to automatically deploy the stabilizer rod at the time of lateral extension. The stabilizer rod can be made to fold-down, extend downwardly, extend outwardly, or move in a combination thereof, to deploy. Contact sensors can be used to control and limit deployment of the stabilizer rod.

Other types of stabilizers can be utilized when the seat laterally extends. For example, in certain embodiments of the present invention, a counterweight balancing system is provided. The counterweight balancing system can also include rails and guides, as well as a counterweight that is approximately the same or a similar weight to the wheelchair user. The counterweight can extend in an opposing direction as the seat via the rails and guides when the seat is deployed such that the center of gravity, including the user, seat, and counter-balance, is maintained at the main frame, for example, in the middle of the main frame. The wheelchair can be configured to automatically deploy the counterweight balancing system at the same time when the seat is extended laterally. An adjustable weight counter-balance can be used. A shifting center of gravity can be used. A pin system can be used to select a number of weights for the counterweight. The lengths of the opposite lateral extensions of the seat-with-user and counterweight do not have to be of the same length. For example, a 30-inch lateral extension of the seat-with-user, in a first direction, can be counter-balanced or offset by a 10-inch lateral extension of a heavier counterweight extended in an opposite direction. Angular adjustment of the mainframe with respect to the surrounding floor or ground can instead or additionally be used to effect counterbalancing and maintenance of an acceptable center-of-gravity.

In certain embodiments, a lifting mechanism can be mounted to the seat of the wheelchair. The lifting mechanism lifts the seat in a vertical direction when activated. The lifting mechanism can be used to further aid in transferring the user from the wheelchair to another support. For example, if a bed, a piece of furniture, a toilet, or the like, is at a position that is elevated above the wheelchair, the user can activate the lifting mechanism to lift the seat in a vertical direction prior to activating the at least one motor to activate the laterally extendable member. The lifting mechanism can be an automatic lifting mechanism, which utilizes a motor such as one or more actuator, linear actuator, or the like. The lifting mechanism can be an electric scissor type lift, a telescoping lift, a rail and guide lift similar to the laterally extendable member described in detail herein, or the like. The lifting mechanism can be activated to lift upon a first activation, and lower upon a second activation. The lifting mechanism can be controlled by the remote controller, key fob controller, or any other type of controller.

Methods are also provided by the present invention. A method is provided that comprises activating a remote controller to actuate a motor configured to laterally move a seat portion of a wheelchair with respect to a base portion of the wheelchair. The wheelchair comprises a control unit, a motor such as a linear actuator, and a laterally extendable and retractable member. The activating can comprise transmitting a signal, for example, a wireless signal, from the remote controller to the control unit and sending a control signal from the control unit to the motor, for example, to a linear actuator. The control signal can control the motor or linear actuator to laterally extend the seat portion with respect to the base portion.

According to various embodiments, the wheelchair comprises a control unit, a linear actuator, and a laterally extendable and retractable member, and the method comprises activating the linear actuator by transmitting a wireless signal from a remote controller to the control unit and sending a control signal from the control unit to the linear actuator. The control signal can control the linear actuator to laterally retract the seat portion with respect to the base portion. When a user is seated on the seat portion, the activating can actuate the motor to laterally extend the seat portion away from the base portion such that the method comprises transporting the user from the wheelchair to a surface apart from the wheelchair, for example, onto a bed, onto a table, onto a chair or other piece of furniture, or the like. When a user is seated on the seat portion, the activating can actuate the motor to laterally retract the seat portion toward the base portion, such that the method comprises transporting the user from a surface apart from the wheelchair, to the platform, and then to a position on the platform centered above the base of the wheelchair.

With reference now to the drawings, and as depicted in FIGS. 1A-2B, wheelchair 2 of the present invention comprises a base assembly 15, seat assembly 13, and leg support assembly 17. Base assembly 15 comprises an extension structure 8 and main frame 4. Base assembly 15 provides the base structural support for wheelchair 2. In operation, a user can control extension structure 8 to extend away from or move toward main frame 4, increasing or decreasing the size of the footprint of wheelchair 2. As the footprint increases, the stability of wheelchair 2 increases. As the footprint decreases, the maneuverability of wheelchair 2 increases. By varying the footprint, a user can achieve the optimum balance of maneuverability and stability for a given situation.

When extending away from main frame 4, footrest 10 can pivot about pivot point 61. Footrest 10 can fold down outwardly, to be flat, for example, parallel with the direction of extension structure 8 and/or the ground. Appropriate mechanics including a footrest actuator can be used. Footrest 10 can fold down inwardly, to be flat, for example, parallel with the direction of extension structure 8 and/or the ground. Appropriate mechanics including a footrest actuator can be used. Sensors, actuators, extension distances, and the like, can be used to ensure that the folding of the footrest does not contact or pinch a user's foot. The footrest actuator can be wired into the control unit and controlled by a separate controller or by the same controllers that are used to control extension of base assembly 15, movement of wheelchair 2, or both. Footrest 10 can be configured to automatically fold flat or lay flat at the same time as, or after, base assembly 15 is extended.

The components of base assembly 15 can comprise any material such as metal, plastic, wood, and the like, or combinations thereof. The components can be designed in various configurations such as a frame, a solid platform, combinations thereof, and the like. Base assembly 15 can be made of aluminum, or another suitable, durable, lightweight metal, for example, chrome molly. Extension structure 8 can be extended or retracted by utilizing telescopic devices. Exemplary telescopic devices and configurations that can be used include those disclosed, for example, in U.S. Pat. No. 8,123,245 B2 to Johnson et al., which is incorporated herein in its entirety by reference. Telescopic devices can be used to enable part of the frame to extend or retract in order to increase or decrease the size of the footprint of the wheelchair.

Telescopic devices that can be used include extension/retraction tracks, extension/retraction rods, extenders, and combinations thereof, that enable the extension structure 8 to move away from or toward main frame 4 in such a manner to allow the overall footprint size of base assembly 15 to increase or decrease. Extension structure 8 is operably secured to the main frame 4 by telescopic devices 12. Extension structure 8 can be made of the same material, or of a similar material, as main frame 4.

The front portion of base assembly 15, which can comprise one or more wheels, can be extended or retracted based on adjustment of the extension device or telescopic device. Adjusting the front portion of wheelchair 2 allows the footprint of base assembly 15 to be increased, when extended, or decreased, when retracted. Main frame 4 and extension structure 8 are supported by two rear wheel assemblies 9 and two front wheel assemblies 11, respectively. The substantially rectangular shape formed between the four different wheel assemblies provides for a much more stable structure than would be provided by a triangular shape that would result from three wheel assemblies.

In yet another aspect, base assembly 15, i.e., the platform, comprises a plurality of wheel assemblies 9, 11 wherein wheel assemblies 9, 11 can be designed to include various shapes, sizes, and tread configurations to accommodate any terrain or a specific terrain. In the embodiment shown in the figures, front wheel assemblies 11 and rear wheel assemblies 9 are utilized, but the present invention can utilize any number of wheel assemblies, including at least two, at least three, at least four, at least five, at least six, at least seven, at least eight, or more, wheel assemblies.

In another aspect, the size of the footprint of base assembly 15 can be increased or decreased by extending or retracting one or more wheel assemblies that are included as part of the configuration of base assembly 15. For example, one or more wheel assemblies 9, 11 can be extended or retracted, for example, by utilizing one or more telescopic devices 12. For example, one or more telescopic devices can be configured to enable at least one wheel assembly 9, 11 to separate from, and move toward or away from, base assembly 15 in such a manner to enable the overall footprint of base assembly 15 to decrease or increase. Outer guide housings 14 of telescopic devices 12 are secured to main frame 4, and slide sections 16 of telescopic devices 12 are secured to extension structure 8. In addition to, or in place of telescopic devices 12, any other extending/retracting device or devices 68 that are mechanical, electrical, pneumatic, hydraulic, or a combination thereof, can be used. Exemplary devices 68 include, for example, a screw cylinder, a linear actuator, a stepper motor, a total hydraulic system, or the like can be used to drive the extending/retracting device or devices. According to various embodiments, sliding section 16 can be configured to move through a set of bearings. Suitable bearings include a flanged or sleeve type journal bearing, a brushing, a fluid bearing, or other type linear bearings that give adequate support while substantially reducing sliding friction. RULON® bearings can be used, with RULON® being the trade name for a family of polytetrafluoroethylene (PTFE) plastics produced by Saint-Gobain Performance Plastics, of Gaithersburg, Maryland. OILITE® bearings can be used, with OILITE® being a trade name of Beemer Precision, Incorporated of Fort Washington, Pennsylvania. FRELON® bearings can be used, with FRELON being a trade name of Pacific Bearing Corp., Roscoe, Illinois.

A threaded shaft, similar to a jackscrew, can be operably secured to an outer guide housing by angular contact bearings or another type of thrust bearings. A female threaded member, for example, a nut, can be secured to slide section 16 and adapted to move along the threaded shaft as the threaded shaft rotates. A lubricant, such as grease, can be used on the threaded shaft to reduce friction. A motor can be secured to main frame 4 and configured to transmit torque to gears on threaded shafts of telescopic devices gears, motor shafts, belts, gear trains, chains, or the like. As the threaded shaft rotates, the female threaded member and slide section 16 move extension structure 8 away from, or draw extension structure 8 toward, main frame 4. Adjustable motor brackets can be used to achieve chain tension.

In another embodiment (not shown), a motor drives a worm gear, which in turn meshes with and drives the rotational motion of a pinion gear. The pinion gear in turn meshes with and drives the translational motion of a rack, as in a typical rack and pinion mechanism. The rack is secured to extension structure 8, and the translational motion of the rack moves extension structure 8 away from, or draws extension structure 8 toward, main frame 4. Other mechanisms can also be used to translate power from one or motors to one or more telescopic devices 12.

In another embodiment, the motion of extension structure 8 is controlled by a mechanism in which slide tubes controlled by a linear actuator replace the threaded shaft and female threaded member described above. The slide tubes are connected at one end to main frame 4, and at the other end to extension structure 8. Activation of the linear actuator causes slide tubes to extend or retract, which moves extension structure 8 away from or toward main frame 4, respectively.

At least one seat can be attached to the seat member or seat support in such a manner that, when operated, the seat is raised, lowered, laterally extended, or laterally retracted, based on movement of the seat member or seat support. Components of seat assembly 13 can connect to both extension structure 8 and main frame 4. Seat assembly 13 can comprise at least one seat member 6, and seat member 6 can be mounted on a seat platform top plate as described below with reference to FIGS. 3A, 3B, 3C, and 4.

As shown in FIGS. 1A-1C and 2A-2B, seat member 6 can be adjusted to provide more comfort and/or stability for the user. Seat member 6 can be adjusted up or down relative to base assembly 15. Seat member 6 can be lowered to provide more stability. Lowering seat member 6 can provide better access to ground level activities and can provide greater stability, which are useful features for outdoor use where the terrain can be more uneven and unpredictable than, for example, a sidewalk or floor of a house. Increasing the height of seat member 6 can provide better access to off-the-ground activities, for example, easier access to table tops and counters, and provides better maneuverable, which are useful features for indoor use where turning tight corners and fitting through narrow doorways may be of a concern.

Figure 2B:
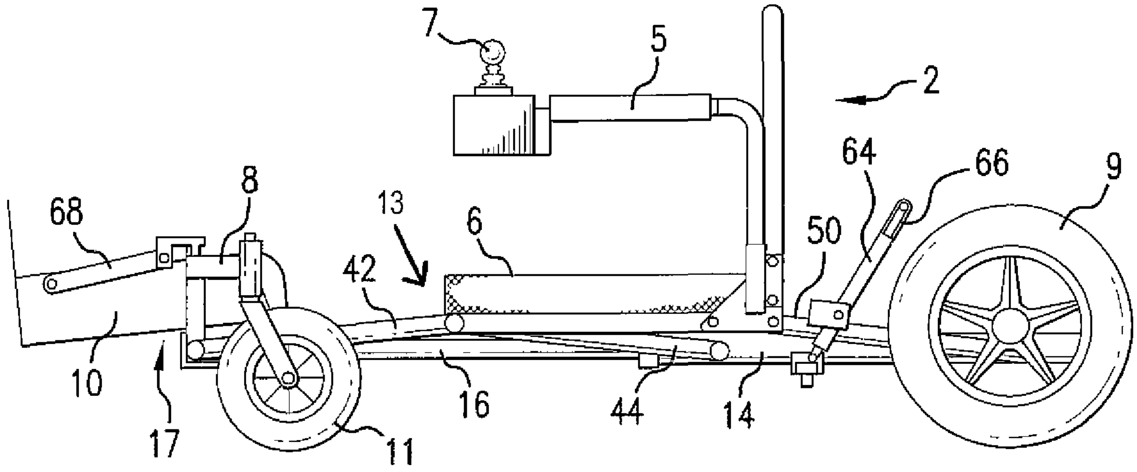
FIG. 2B is a side view of the wheelchair shown in FIG. 2A.
Figure 1C:
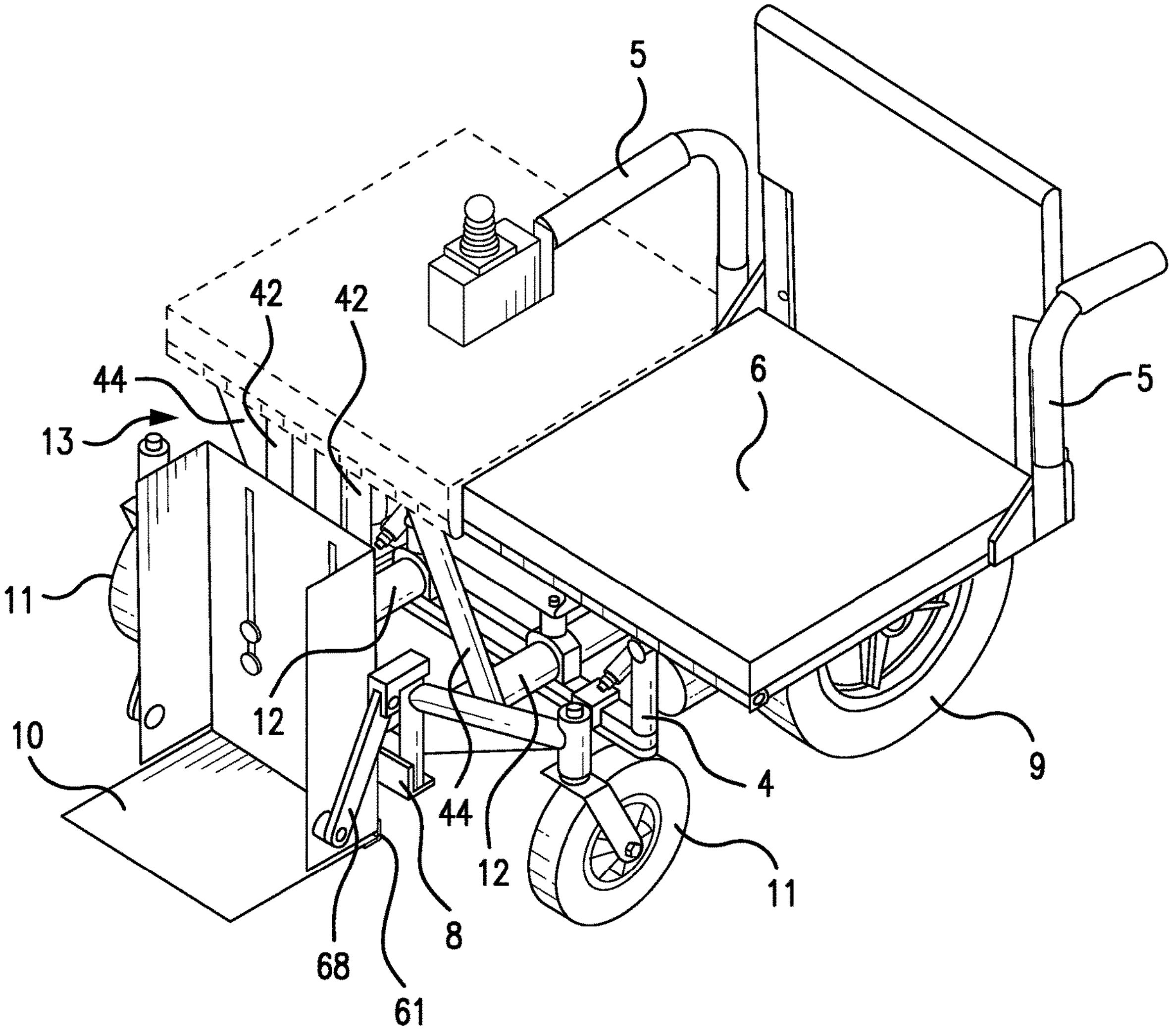
FIG. 1C is a perspective view of the wheelchair shown in FIG. 1B, but wherein the seat of the wheelchair has been translated to the left, from the viewpoint of a user seated on the seat, by using a sliding seat feature of the present invention.
Figure 2A:
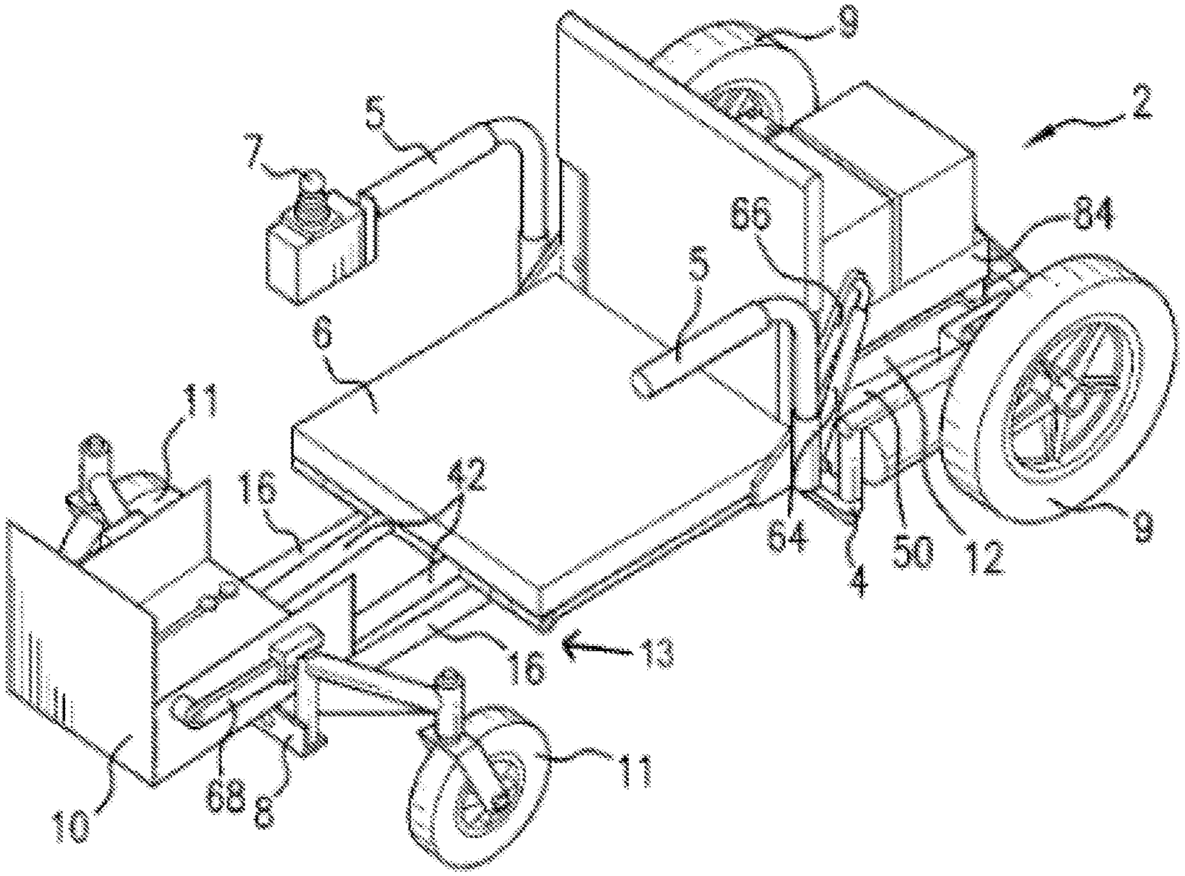
FIG. 2A is a perspective view of the wheelchair shown in FIG. 1B, but wherein the wheelchair has been transformed into a lowest, recumbent position.

FIG. 1C shows the wheelchair 2 in its normal, non-recumbent position, but wherein seat member 6 has been slid over, to the left, according to an embodiment of the present invention. Shifting the seat member 6, that is, sliding the seat member, can be accomplished by activation of a laterally extendable member as described herein and with particular reference to FIGS. 3A-8. While FIG. 1C shows seat member 6 slid to the left while wheelchair 2 is in an upright position, it is also to be understood that seat member 6 can be made to slide when wheelchair 2 is in its recumbent position, for example, as shown in FIGS. 2A and 2B.

In accordance with the present invention, a single wheelchair is provided that can be used for a variety of activities, that can provide a user with a greater range of motion, that can operate both indoors and outdoors, and that can assist a user with getting onto and off of the wheelchair. Seat member 6 can be translated or laterally extended to left, translated or laterally extended to right, or enabled to provide translation or lateral extension to the left and to the right. A wireless remote control can be used to actuate the lateral extension and retraction of the seat member. For movement up and down, seat member 6 can be lowered by moving in the direction of the front of the unit, or generally forward relative to base assembly 15. Seat member 6 can be pivoted during such movement such that seat member 6 is lowered as it moves forward. In a different aspect, seat member 6 is lowered by moving it generally back relative to base assembly 15, preferably by pivoting seat member 6 such that it is lowered as it moves back. In another aspect, seat member 6 is lowered by moving it down with little or no general movement forward or backward relative to base assembly 15.

Seat assembly 13, which, in operation, laterally extends from and laterally retracts back to a center-wheelchair position, as described herein, can comprise a rigid yet operable framework. Much of the framework can comprise aluminum tube stock, another suitable, durable, metal or metal alloy such as lightweight chrome molly, magnesium, titanium, steel, fiber, carbon fiber, wood, plastic, another material having suitable functional qualities, or a combination thereof.

Figure 3A:
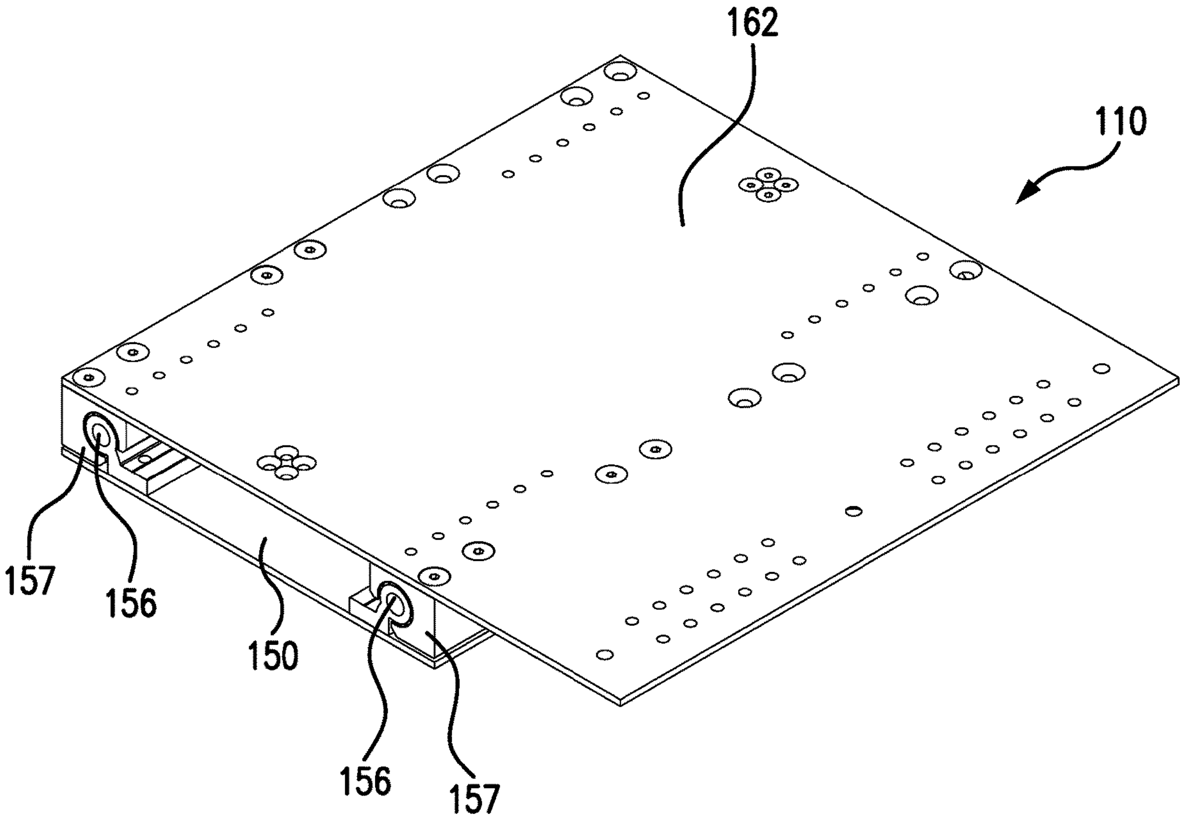
FIG. 3A is a top perspective view of a slide assembly, according to an embodiment of the present invention.
Figure 3B:
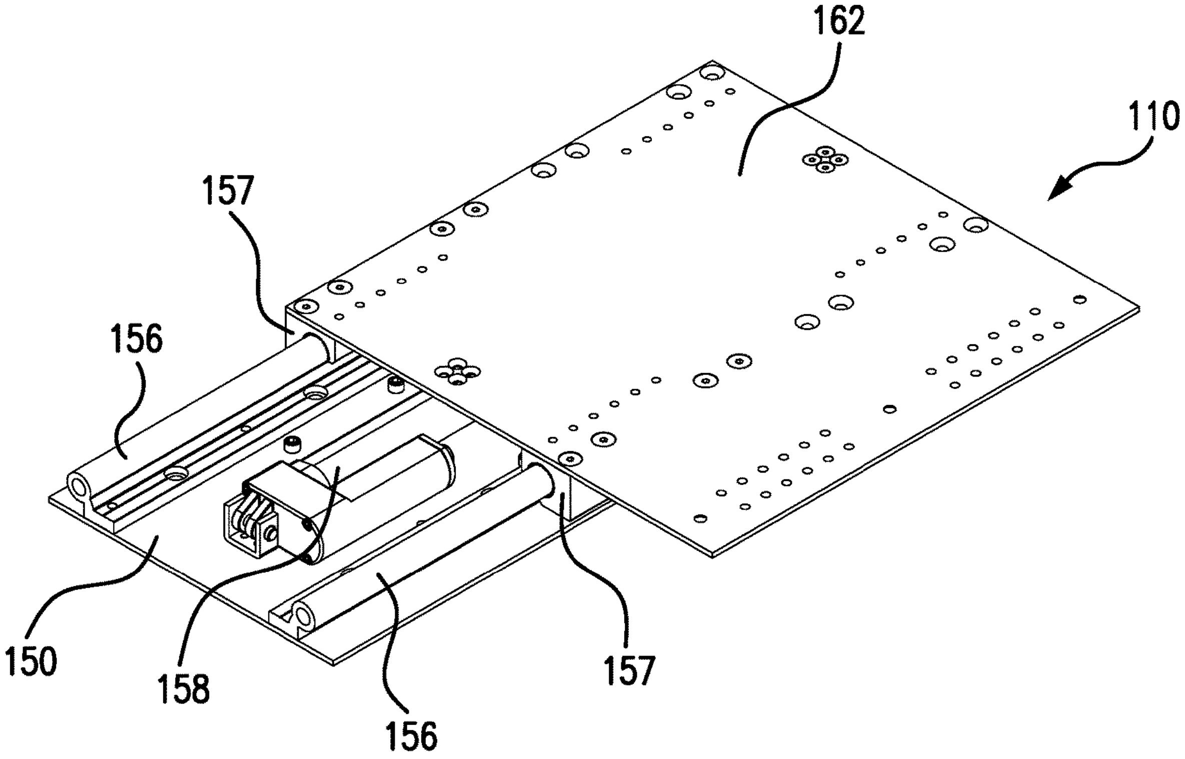
FIG. 3B is a top perspective view of the slide assembly of FIG. 3A, showing a displacement between the top plate and the bottom plate, in a first direction.
Figure 3C:
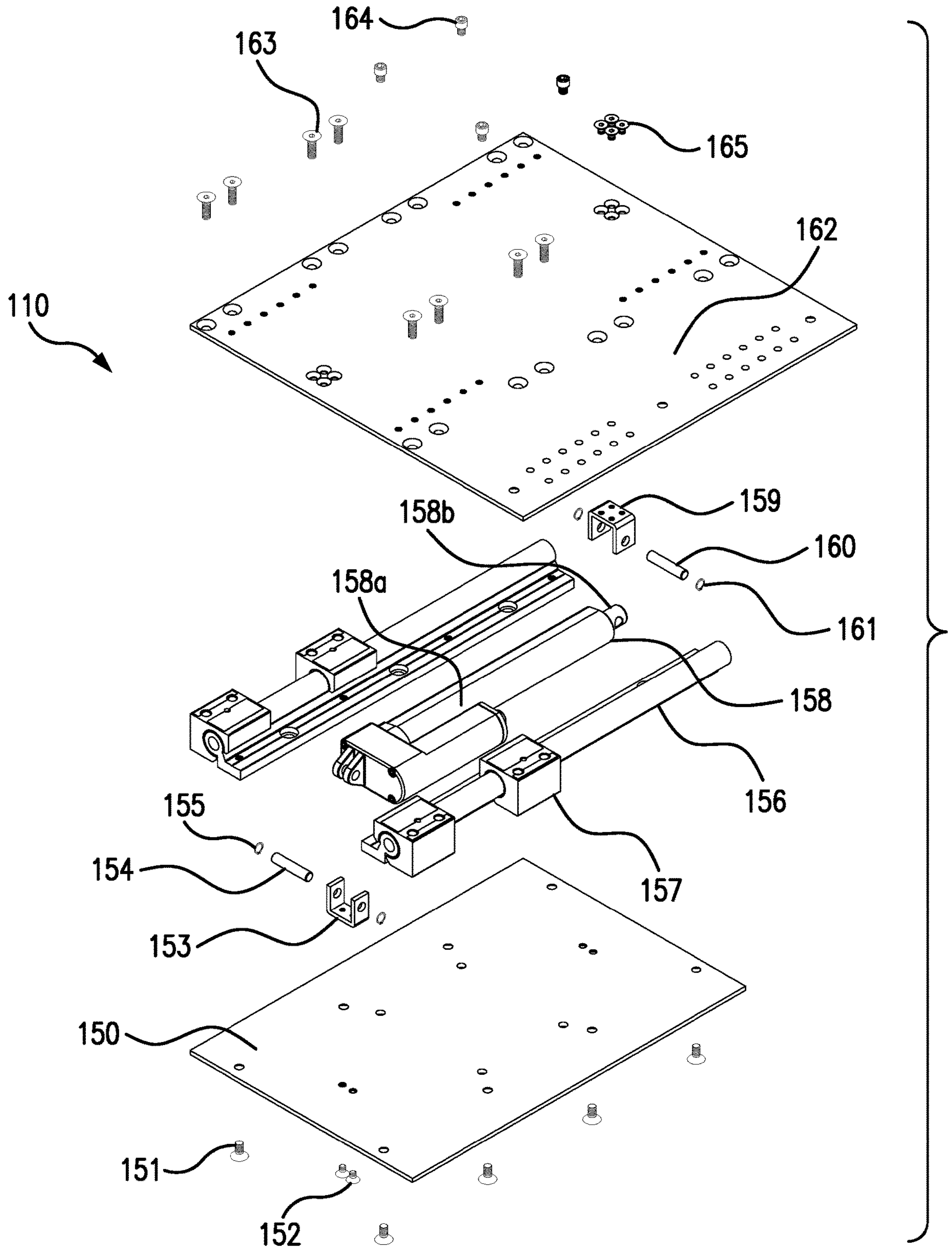
FIG. 3C is an exploded view of the slide assembly of FIGS. 3A and 3B.

FIGS. 3A-3C show a slide assembly 110 according to an embodiment of the present invention. Slide assembly 110 includes a bottom plate 150 and a top plate 162. Bottom plate 150 can be secured to a frame of a wheelchair. Top plate 162 can be a platform that secures to and supports a seat or chair of the wheelchair. Slide assembly 110 further include an actuator 158, saddles 157, and rails 156. Although saddles 157 and rails 156 are shown as being offset with top plate 162, saddles 157 and rails 156 can be centered relative to top plate 162. In other embodiments, top plate 162 and bottom plate 150 are the same size. Saddles 157 and rails 156 can be sufficiently spaced apart to add maximum stability during the extension of the wheelchair seat.

As shown in FIGS. 3A-3C, saddles 157 are secured to a bottom surface of top plate 162 and rails 156 are secured to top surface of bottom plate 150. In an alternative embodiment, saddles are secured to the top surface of the bottom plate and rails are secured to the bottom surface of top plate 162. Saddles 157 include guides. Rails 156 are slidably engaged within the guides. Saddles 157 and rails 156 restrict movement of top plate 150 and bottom plate 150 relative to one another, in two dimensions. As such, top plate 150 can move side to side relative to bottom plate 150, but not up and down or in and out. In certain embodiments, saddles 157 are in a fixed position and rails 156 slide along saddles 157. In other embodiments, rails 156 are in a fixed position and saddles 157 slide along rails 156. The sliding engagement between rails 156 and saddles 157 can be further facilitated by lubrication, ball bearings, and the like.

Linear actuator 158 includes a housing **158*a* and a piston 158*b* that extends and retracts from housing 158*a*. Exemplary of suitable linear actuators are DRYLIN® linear actuators available from Igus, Inc. of Rumford, Rhode Island. DRYLIN® is a registered trademark of IGUS GMBH, of Germany. Housing 158*a* is secured to bottom plate 150 and piston 158*b* is secured to top plate 162. Prior to activating actuator 158, slide assembly 110 is in a neutral position, as shown in FIG. 3A. When actuator 158 is activated to extend piston 158*b*, saddles 157 slide along rails 156 and top plate 162 is displaced in a first direction by piston 158*b*, as shown in FIG. 3**B.

FIG. 3C is an exploded view of slide assembly 110 shown in FIGS. 3A and 3B. FIG. 3C shows two rails 156 that can be secured to opposing sides of bottom plate 150. Each of rails 156 includes a base and an elongated cylinder extending along a length of bottom plate 150. The bases of rails 156 have openings that align with openings of bottom plate 150. Screws 151 or other fasteners secure the bases of rails 156 to opposing sides of bottom plate 150 by screwing into the aligned openings.

FIG. 3C further shows two pairs of saddles 157. Each of saddles 157 include guides that complement the elongated cylinders of rails 156 such that guides fit around and slide along the length of rails 156. Each of saddles 157 have openings that align with openings of top plate 162. Screws 163 or other fasteners secure the saddles 157 to opposing sides of top plate 162 by screwing into the aligned openings.

As mentioned above, actuator 158 includes housing 158*a* and piston 158*b*. Housing 158*a* includes connector prongs extending rearward opposite piston 158*b*. The connector prongs include aligned openings. A lower U-bracket 153 is secured to bottom plate 150 at a first side of slide assembly 110 by screws 152 or other types of fasteners. Lower U-bracket 153 includes a first arm and a second arm with aligned openings. Connector prongs fit in between the first arm and the second arm, such that the openings of the connector prongs align with the openings of the first and second arm. A pin 154 fits through the aligned openings and snap rings 155 secure pin 154 within the aligned openings, thereby securing housing 158*a* to bottom plate 150. Piston 158*b* has an opening at its tip. An upper U-bracket 159 is secured to top plate 162 at a second side of slide assembly 110 by screws 165 or other types of fasteners. Upper U-bracket 159 includes a first arm and a second arm that have aligned openings. The tip of piston 158*b* fits in between the first arm and the second arm, such that the opening of piston 158*b* aligns with the openings of the first and second arm. A pin 160 fits through the aligned openings and snap rings 161 secure pin 160 within the aligned openings, thereby securing piston 158*b* to top plate 162.

Figure 4:
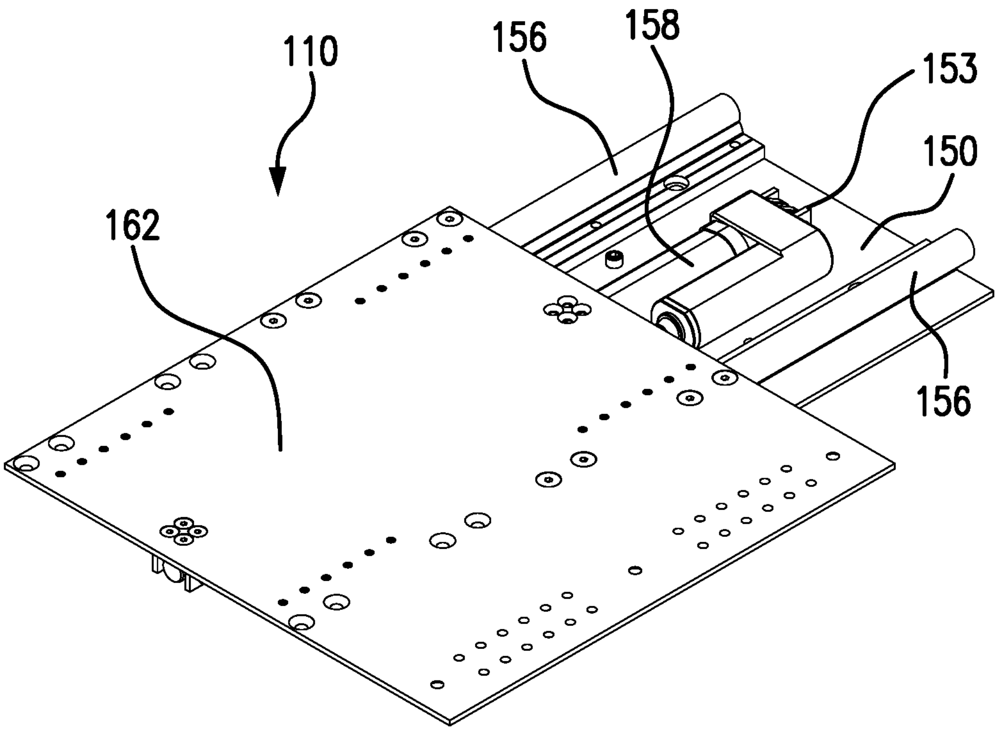
FIG. 4 is a top perspective view of a slide assembly according to another embodiment of the present invention, showing the top plate displaced relative to the bottom plate, in a second direction that is opposite the first direction shown in FIG. 3B.

FIG. 4 shows the same slide assembly 110 as shown in FIGS. 3A-3C, but assembled in a different configuration. Slide assembly 110 includes top plate 162, bottom plate 150, rails 156, and saddles (not shown), that are in the same configuration as for slide assembly 110 shown in FIGS. 3A-3C. Linear actuator 158, however, is facing an opposite direction. In such a configuration, lower U-bracket 153 is secured to bottom plate 150 at the second side of slide assembly 110 and the upper U-bracket (not shown) is secured to top plate 162 at the first side of slide assembly 110. Thus, the piston (not shown) is facing the opposite direction as compared to the embodiment shown in FIGS. 3A-3C. Accordingly, when actuator 158 is activated to extend the piston, saddles 157 slide along rails 156 and top plate 162 is displaced in a second direction by the piston, the second direction being opposite the first direction.

As shown in FIGS. 3A-3C and 4, the present invention can be assembled to displace the top plate 162 to the right, and therefore displace the seat of the wheelchair to the right. The present invention can be assembled to displace top plate 162 to the left, and therefore displace the seat of the wheelchair to the left. In other embodiments, the present invention can incorporate more than one linear actuator, such that top plate 162 can be moved to the left or to the right without the need to disassemble and assemble slide assembly 110. In another embodiments, slide assembly 110 can be arranged such that when slide assembly 110 is in a neutral position, piston 158*b* is partially extended from housing 158, when top plate 162 is extending in a first direction, piston 158*b* is fully extended from housing 158, and when top plate 162 is extending in a second direction opposite the first direction, piston 158*b* is fully retracted into housing 158.

Figure 5A:
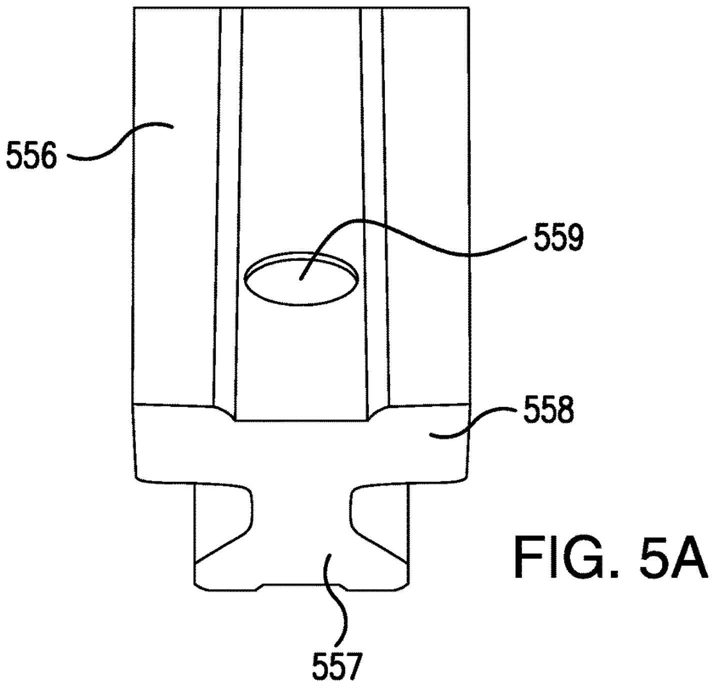
FIG. 5A is a front perspective view of a rail that can be implemented according to an embodiment of the present invention.
Figure 5B:
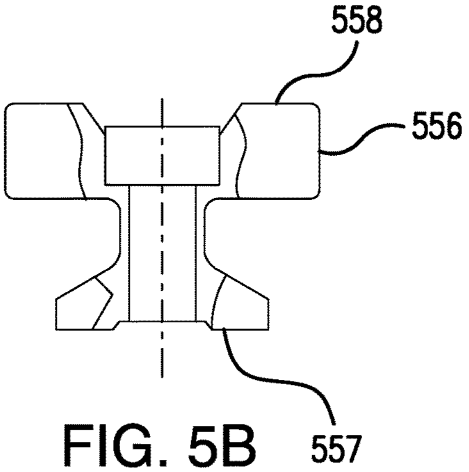
FIG. 5B is an end view of the rail shown in FIG. 5A.
Figure 5C:
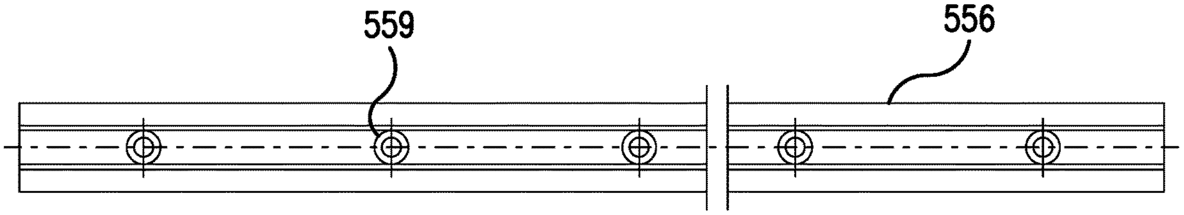
FIG. 5C is a top view of the rail shown in FIGS. 5A and 5B.

FIGS. 5A-5C show a rail 556 that can be used according to various embodiments of the present invention. Rail 556 can be part of a DRYLIN® T rail guide system, such as part no. TS-01-20 or other type of rail 556 available from Igus, Inc. of Rumford, Rhode Island. DRYLIN® is a registered trademark of IGUS GMBH, of Germany. Rail 556 shown in FIGS. 5A-5C has a different shape than the rail shown in FIGS. 3A-3C and 4. Rail 556 is an elongated beam that can be secured to either a top plate or a bottom plate of a slide assembly as described herein. Rail 556 can include a base section 557 and a top section 558. Base section 557 can extend in a vertical direction, and top section 558 can extend in a horizontal direction, forming a T-shaped cross section. Alternatively, rail 556 can have an I-shape, an H-shape, an E-shape, a C-shape, or any other shaped cross-section. Openings 559 can be defined through base section 557 and top section 558. Openings 559 can align with openings of the top plate or the bottom plate of the slide assembly. Screws or other fasteners run through the aligned openings and fasten rails 556 to the top or bottom plate.

Figure 6:
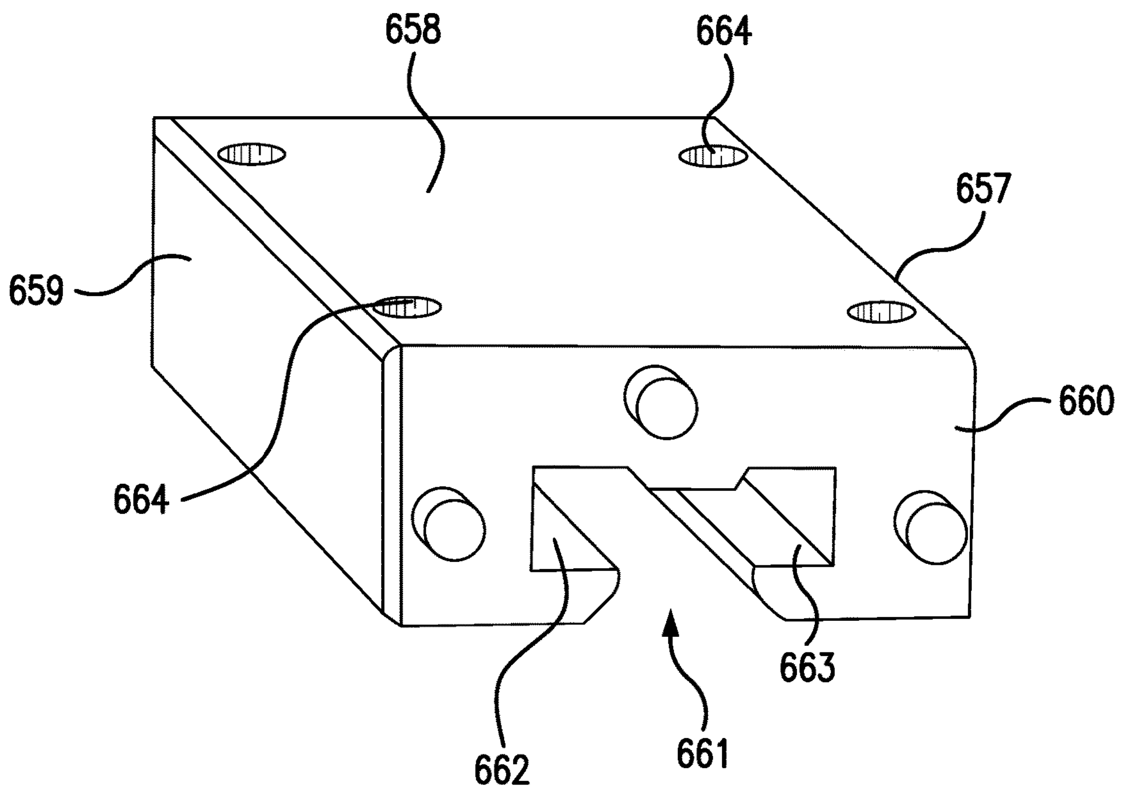
FIG. 6 is a front perspective view of a saddle that can be implemented according to an embodiment of the present invention.

FIG. 6 is a perspective view of a carriage, guide, or saddle 657 that can be used according to exemplary embodiments of the present invention. For instance, saddle 657 can be part of a DRYLIN® T rail guide system, such as part no. TW-02-20 available from Igus, Inc. of Rumford, Rhode Island, or another type of saddle. Saddle 657 shown in FIG. 6 has a different shape than the saddle shown in FIGS. 3A-3C and 4. Saddle 657 can be secured to either a top plate or a bottom plate of a slide assembly, as previously described in detail above. For instance, saddle 657 can include openings 664 that align with openings of the top or bottom plate. Screws or other fasteners run through the aligned openings to secure the saddle 657 to the top or bottom plate.

Saddle 657 includes a top member 658, a first side member 659, and a second side member 660. First side member 659 and second side member 660 extend downward from opposing sides of top member 658. First side member 659 includes a first ledge 662 that extends inwards and second side member 660 includes a second ledge 663 that extends inward. A guide 661 or channel is defined by inner walls of top member 658, first side member 659, second side member 660, first ledge 662, and second ledge 663. Guide 661 has a wide portion defined in between upper portions of first side member 659 and second side member 660, and a narrow portion defined in between first ledge 662 and second ledge 663. The wide and narrow portions of guide 661 define a T-shaped cross-section or other shape that compliments the shape of the rail, such as an I-shape, an H-shape, an E-shape, a C-shape, or the like.

Figure 7A:
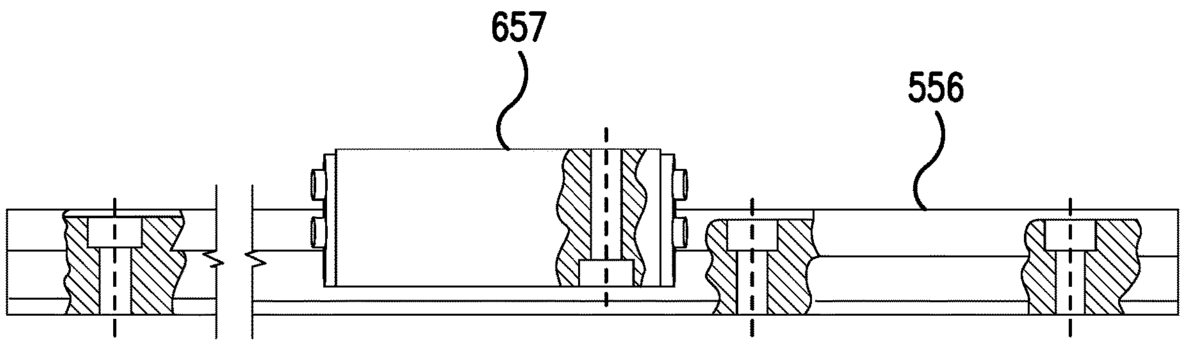
FIG. 7A is a side view of a rail and a saddle slidably engaged with one another and that can be implemented together according to an embodiment of the present invention.
Figure 7B:
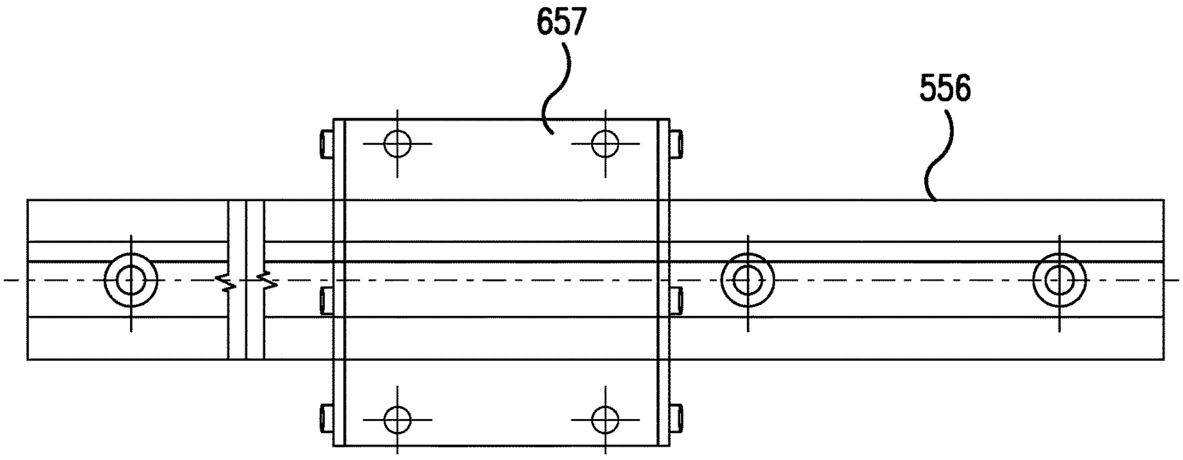
FIG. 7B is a top view of the rail and the saddle shown in FIG. 7A.
Figure 7C:
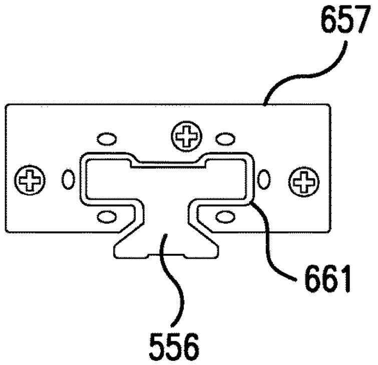
FIG. 7C is an end view of the rail and the saddle shown in FIGS. 7A and 7B.

FIG. 7A is a side view of rail 556 and saddle 657 slidably engaged with one another, according to an embodiment of the present invention. FIG. 7B is a top view of rail 556 and saddle 657 of FIG. 7A. FIG. 7C is a front view of rail 556 and saddle 657 of FIG. 7A. As can be seen, the shape of guide 661 compliments the shape of rail 556 such that saddle 657 either slides along rail 556 or rail 556 slides along saddle 657 when one or the other is displaced by the actuator. The engagement of saddle 657 and rail 556 provides a tight tolerance such that the seat of the wheelchair remains stable when being displaced in a first and second direction, by the actuator. As mentioned above, the sliding engagement can be enhanced by lubrication, ball bearings, or the like.

Figure 8:
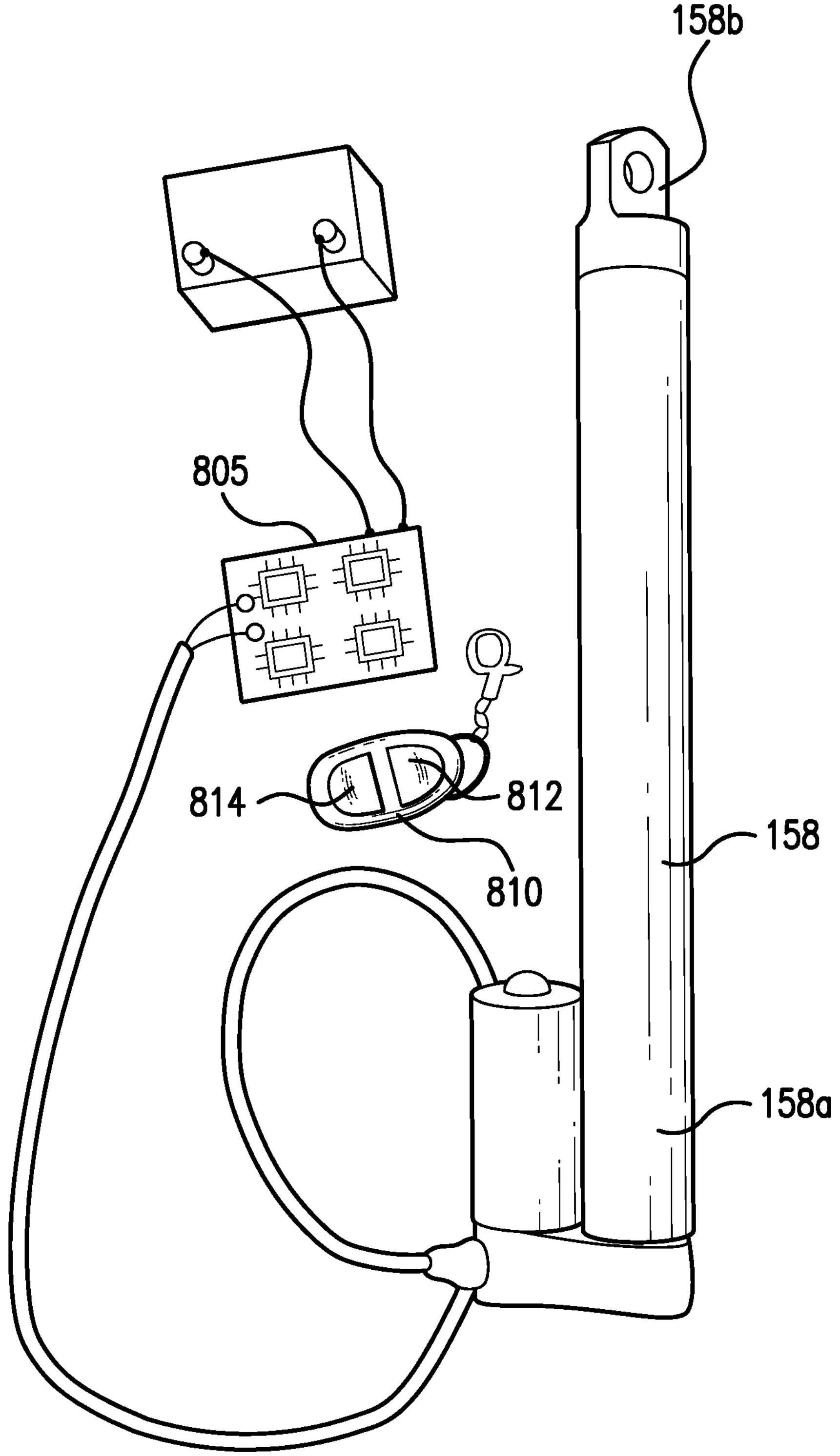
FIG. 8 is a top view of an actuator, a control unit including a receiver, electrically connected to the actuator, and a key fob that comprises a transmitter that wirelessly communicates with the receiver.

FIG. 8 is a top view of actuator 158, a receiver 805 electrically connected to the actuator by electrical wiring, and a key fob 810 having a transmitter that wireless communicates with receiver 805.

FIG. 8 shows actuator 158 disassembled from the top plate and the bottom plate. Actuator 158 is a linear actuator having a housing 158*a* and a piston 158*b* that extends and retracts from housing 158*a*. Actuator 158 can be a mechanical actuator, such as a screw type actuator, a wheel and axle type actuator, or a cam type actuator. Alternatively, actuator 158 can be a hydraulic actuator, a pneumatic actuator, a piezoelectric actuator, an electromechanical actuator, a telescoping linear actuator, or the like.

The present invention can utilize one or more actuators 158. When utilizing one actuator 158, actuator 158 can displace top plate relative to bottom plate in a first direction from a neutral position, and then back to the neutral position. In certain embodiments, one actuator 158 can be utilized to displace the top plate relative to the bottom plate in the first direction from a neutral position, and then back to the neutral position, and displace the top plate relative to the slide assembly in a second direction from the neutral position and then back to the neutral position. When utilizing more than one actuator 158, a first actuator can be used to displace the top plate in a first direction and back to the neutral position, and a second actuator can be used to displace the top plate in a second direction, opposite the first direction, and then back to the natural position. In such embodiments, actuators 158 can engage top plate when in use and disengage from top plate when not in use.

As shown in FIG. 8, actuator 158 can be controlled wirelessly. In other embodiments, actuator 158 can be controlled by a wired connection using controllers of the wheelchair or can be controlled by both wired and wireless connections. FIG. 8 shows key fob 810 that can be used to control actuator 158. In such embodiments, wireless receiver 805 is coupled to the wheelchair and hard wired to actuator 158. Key fob 810 can transmit radio waves to communicate with receiver 805. Receiver 805 is programmed to activate the actuator to extend and/or retract upon receiving the signal from key fob 810. Key fob 810 and receiver 805 can utilize radio frequency identification (RFID) for identification purposes, such that key fob 810 is paired with receiver 805. When the key fob 810 is in close proximity to receiver 805, key fob 810 can be utilized to activate the actuator. In certain embodiments, communication distances in which key fob 810 and receiver 805 can communicate are limited. For example, key fob 810 and receiver 805 can only be capable of communicating within a 30-foot proximity, within a 20-foot proximity, within a 10-foot proximity, or less, allowing the user of the wheelchair or a caregiver control only when key fob 810 is in close proximity to the wheelchair.

While specific embodiments, configurations, and arrangements are discussed herein, it should be understood that this is done for illustrative purposes only. A person skilled in the relevant art will recognize that other embodiments, configurations, and arrangements can be used without departing from the spirit and scope of the present invention. It will also be apparent to a person skilled in the relevant art that this invention can be employed in a variety of other devices and applications. While specific examples described may refer to a wheelchair, the invention equally applies to any mobile unit, a vehicle, or any other mobile device.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such a range is separately disclosed. Where a range of numerical values is recited herein, unless otherwise stated, the range is intended to include the endpoints thereof, and all integers and fractions within the range. It is not intended that the scope of the invention be limited to the specific values recited when defining a range.

All patents, patent applications, and publications mentioned herein are incorporated herein in their entireties, by reference, unless indicated otherwise.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A wheelchair comprising a plurality of wheels, a base, a seat member, a laterally extendable member, and at least one motor, wherein the at least one motor comprises a pair of motors, the base comprises a main frame, the seat member is mounted on the laterally extendable member, the laterally extendable member is configured to laterally extend the seat member in relation to the main frame such that a user sitting on the seat member can be moved laterally in relation to the main frame, the laterally extendable member is configured to laterally retract the seat member in relation to the main frame, and the at least one motor is operably connected to the main frame and one or both of the laterally extendable member and the seat member.

2. The wheelchair of claim 1, wherein the at least one motor comprises a linear actuator.

3. The wheelchair of claim 1, further comprising a motor control system configured to actuate the at least one motor to perform an extension function.

4. The wheelchair of claim 1, further comprising a motor control system configured to actuate the at least one motor to perform an extension function and configured to actuate the at least one motor to perform a retraction function.

5. The wheelchair of claim 1, wherein the motor control system comprises a wireless remote controller.

6. The wheelchair of claim 5, wherein the wireless remote controller comprises a key fob configured to remotely initiate an action of the at least one motor.

7. The wheelchair of claim 5, wherein the wireless remote controller has an operating range of 25 feet or less.

8. The wheelchair of claim 1, further comprising a guide and rail system, wherein:

- the guide and rail system comprises one or more rails and one or more guides;
- the seat member is mounted to the one or more rails, to the one or more guides, or to both;
- the other of the one or more rails or the one or more guides is mounted to the main frame; and
- the one or more rails and the one or more guides cooperate such that the one or more guides (1) restrict motion of the one or more rails in two directions, and (2) guide motion of the one or more rails in a third direction.

9. The wheelchair of claim 1, further comprising a guide and rail system, wherein:

the guide and rail system comprises a plurality of rails and a plurality of guides;

the seat member is mounted to the plurality of rails;

each of the plurality of rails is parallel to the others of the plurality of rails;

the plurality of guides is mounted to the main frame; and the plurality of rails and plurality of guides cooperate such that the plurality of guides (1) restricts motion of the plurality of rails in two directions, and (2) guides motion of the plurality of rails in a third direction.

10. The wheelchair of claim 1, further comprising a guide and rail system, wherein:

the guide and rail system comprises a plurality of rails and a plurality of guides;

the seat member is mounted to the plurality of guides;

the plurality of rails is mounted to the main frame;

each of the plurality of rails is parallel to the others of the plurality of rails; and the plurality of rails and plurality of guides cooperate such that the plurality of rails (1) restrict motion of the plurality of guides in two directions, and (2) guides motion of the plurality of guides in a third direction.

11. A wheelchair comprising a plurality of wheels, a base, a seat member, a laterally extendable member, at least one motor, a leg support assembly, and a longitudinally extendable member, wherein the base comprises a main frame, the seat member is mounted on the laterally extendable member, the laterally extendable member is configured to laterally extend the seat member in relation to the main frame such that a user sitting on the seat member can be moved laterally in relation to the main frame, the laterally extendable member is configured to laterally retract the seat member in relation to the main frame, the at least one motor is operably connected to the main frame and one or both of the laterally extendable member and the seat member, the main frame comprises at least two wheels, the longitudinally extendable member comprises at least two wheels, the leg support assembly is pivotably connected to the longitudinally extendable member, the length of the base is configured to be increased by extending the longitudinally extendable member from the main frame and decreased by retracting the longitudinally extendable member into the main frame, the main frame and the longitudinally extendable member are configured such that the distance between the at least two wheels of the main frame and the at least two wheels of the longitudinally extendable member increases or decreases as the longitudinally extendable member respectively extends and retracts, the height of the seat member is configured to be increased or decreased, and the leg support assembly is configured to pivot along with a user's legs at the knees as the leg support assembly extends away from the seat member and the user's legs extend.

12. The wheelchair of claim 11, wherein the longitudinally extendable member is operably connected to at least one extender device.

13. The wheelchair of claim 12, wherein the base is lengthened when the at least one extender device is extended, the seat member is operably connected to at least one seat extender device, and the seat member is configured to be lowered when the at least one seat extender device is extended.

14. A wheelchair comprising a plurality of wheels, a base, a seat member, a laterally extendable member, at least one motor, and at least one transformer motor operably connected to the main frame, wherein the base comprises a main frame, the seat member is mounted on the laterally extendable member, the laterally extendable member is configured to laterally extend the seat member in relation to the main frame such that a user sitting on the seat member can be moved laterally in relation to the main frame, the laterally extendable member is configured to laterally retract the seat member in relation to the main frame, the at least one motor is operably connected to the main frame and one or both of the laterally extendable member and the seat member, and the transformer motor is configured: to adjust the length of the base; to adjust the height of the seat member; or to adjust both the length of the base and the height of the seat member.

* * * * *